April 24, 1934.  M. BERKOWITZ  1,955,938
MOTION PICTURE PROJECTING MACHINE
Filed Aug. 5, 1930    4 Sheets-Sheet 1

INVENTOR
MICHAEL BERKOWITZ
BY
ATTORNEYS

April 24, 1934. M. BERKOWITZ 1,955,938
MOTION PICTURE PROJECTING MACHINE
Filed Aug. 5, 1930 4 Sheets-Sheet 2
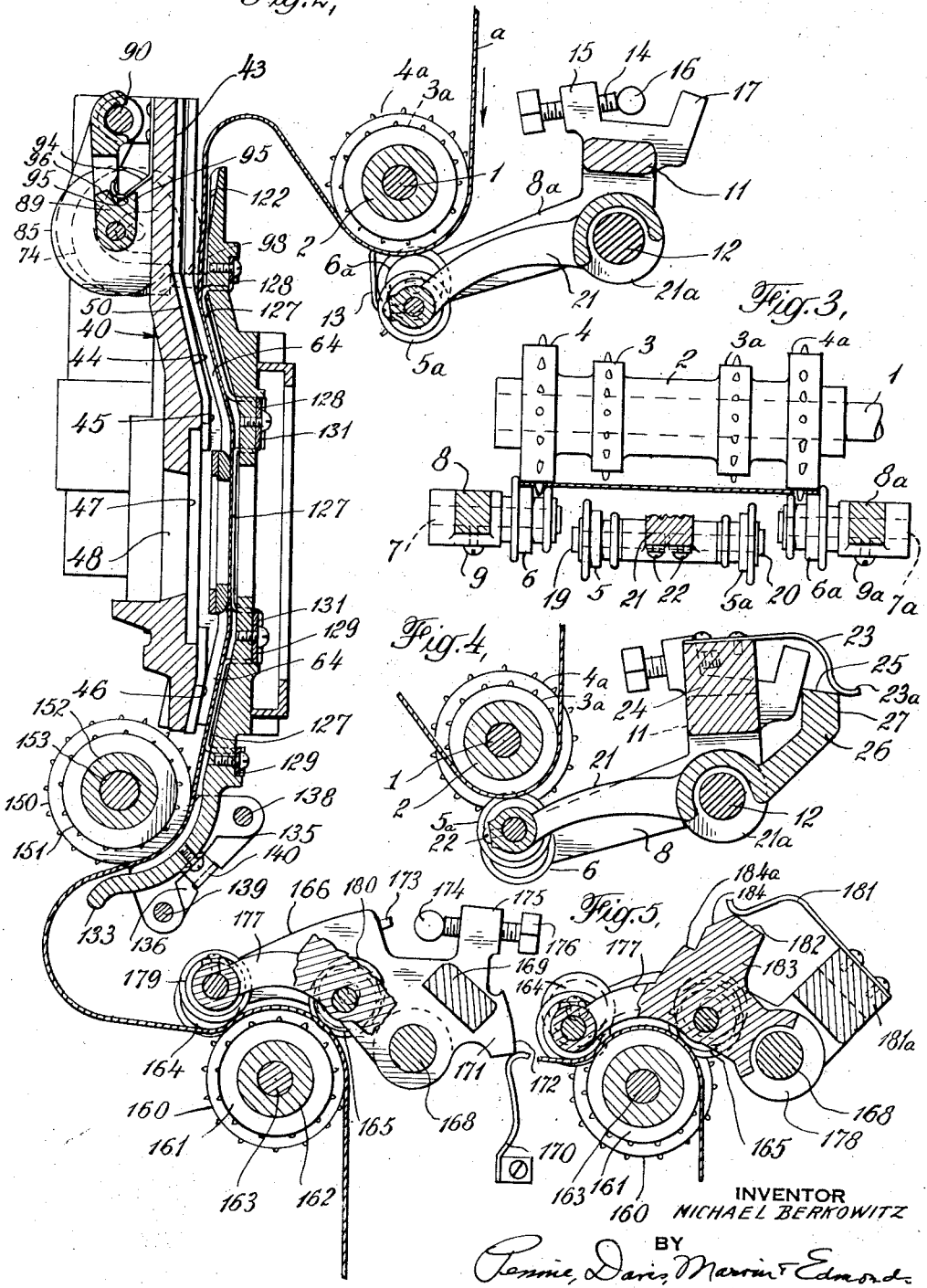
INVENTOR
MICHAEL BERKOWITZ
BY
ATTORNEYS

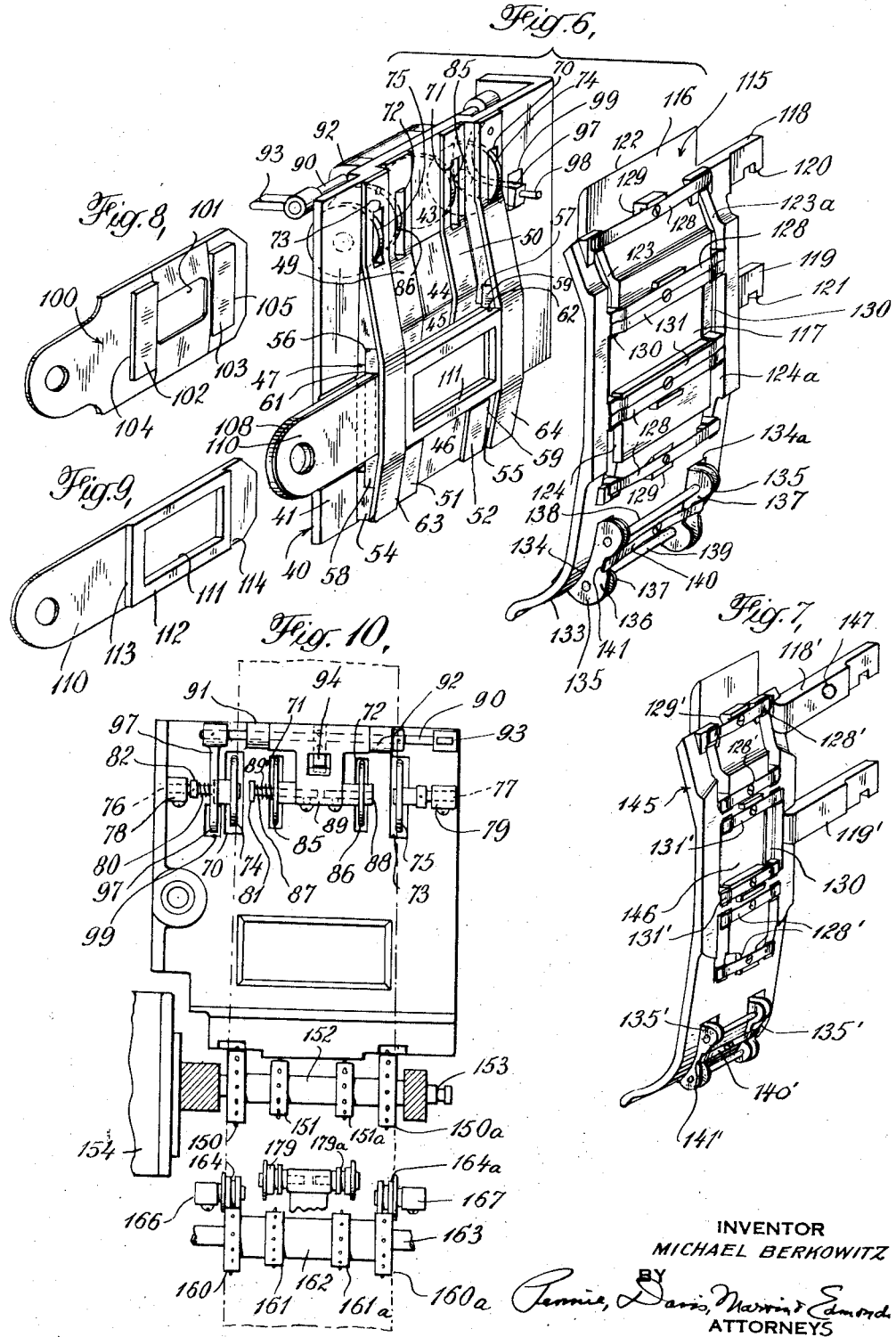

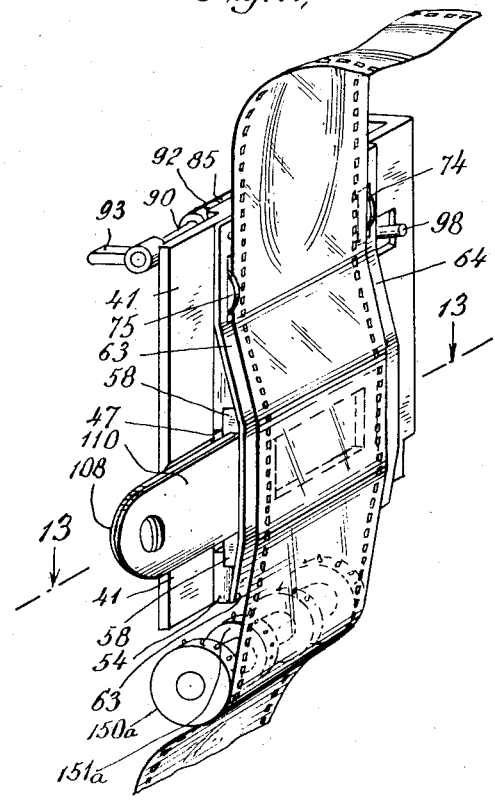
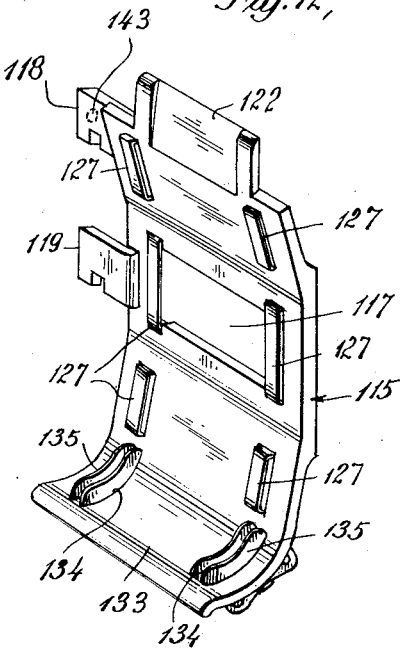
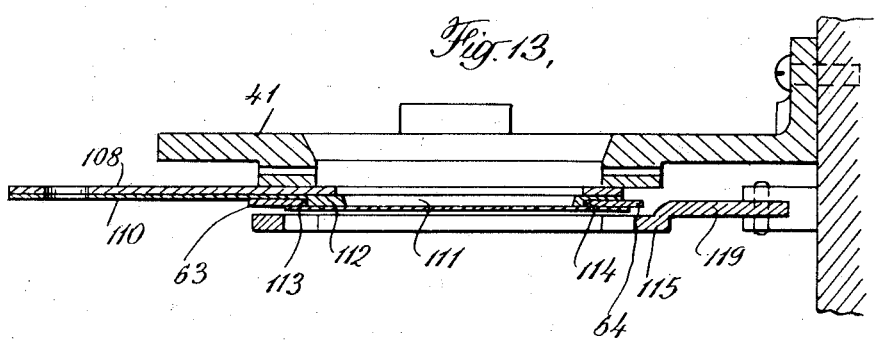

Patented Apr. 24, 1934

1,955,938

UNITED STATES PATENT OFFICE 1,955,938

MOTION PICTURE PROJECTING MACHINE

Michael Berkowitz, New York, N. Y., assignor to United Research Corporation, Long Island City, N. Y., a corporation of Delaware Application August 5, 1930, Serial No. 473,173

13 Claims. (Cl. 88—17)

This invention relates to improvements in motion picture projecting machines and has for its object the provision of a projector capable of utilizing films of different sizes. More particularly the invention aims to provide a motion picture projector having film feeding mechanism and associated parts adapted to be readily conditioned for use with any one of a plurality of films of different widths.

Until recently the only type of motion picture film used to any practical extent for public exhibition purposes was the film of 35 mm. width having a continuous row of picture squares of standard dimensions printed thereon intermediate its edges, the term "picture squares" being used to signify those rectangular areas of the film which are designed to be successively brought into position between a source of light and a projecting lens for casting images upon a screen. The effect of the long continued adherence by the motion picture industry to this type of film was a standardization in the construction of commercial projecting machines insofar as their film feeding mechanism was designed exclusively to accommodate this particular size of film and no other. This film feeding mechanism which has now become practically universal consists broadly of a series of feed sprockets mounted upon parallel shafts and adapted to engage the marginal perforations of a film. As the various picture squares upon the film are progressively fed into registry with an opening formed in a plate, known as an aperture plate, in front of the lens and momentarily held stationary, a beam of light emanating from the lamphouse is periodically uncovered by a revolving shutter to expose the film to the beam which, passing through the film and being brought to focus upon the screen, causes a succession of images to be cast thereon. However, as motion picture theatres increased in size it became necessary to project larger and larger images upon the screen in order to afford visibility from distant parts of the theatre, and as there is a limit to the size of the image which can be satisfactorily projected from the picture carried by a 35 mm. film, as a result new sizes of films, such as those of 65 and 70 mm., eventually came into existence. These new sizes of films carry picture squares in proportion to their widths and consequently of such dimensions as to permit the projection of correspondingly larger images; and while designed for employment primarily in conjunction with what may be termed "oversize" screens, they are equally suitable for use with those of normal area.

The introduction of these non-conventional sizes of films in the industry has resulted in embarrassment to motion picture exhibitors for the reason that the projectors now in general use, being designed solely to accommodate a 35 mm. film, cannot be used with films of the additional sizes now available, such films requiring projectors having their film feeding mechanism appropriately arranged for cooperation with a film of non-standard width. Not only is the acquisition of such more or less duplicative equipment in itself quite costly, but frequently the operator's booth must be remodeled in order to provide the space required for the increased number of machines, which involves a still greater expense.

It is the purpose of the present invention to overcome the above objections by providing a projecting machine capable of interchangeable use with films of a plurality of different widths, such as 35, 65 and 70 mm., a single machine in this way being made to serve the purpose of the multiplicity of projectors heretofore required. More specifically the construction and arrangement of the film feed mechanism, together with the other parts of the apparatus which cooperate with the film in its passage through the projector, is such as to be rendered quickly and selectively available for use with any one of a number of sizes of film. An important feature of the film feeding mechanism of the invention resides in the grouping of a plurality of pairs of feed sprocket wheels of varying diameters in a central position upon a common shaft, the diameters of each of the pairs of sprocket wheels bearing such relationship to the size of the film with which they are designed to cooperate that when the shaft is rotated through a definite arc the picture squares upon whatever width of film is being employed will be moved into correct position in front of the lens.

Another feature of the invention consists in an improved form of film trap designed to provide tracks located in relatively different planes for a plurality of different sizes of films, the arrangement being such as to bend the film strip out of a normally straight vertical path into a vertical plane parallel thereto as it is drawn by the feeding mechanism to a position in front of the projecting lens. A desirable consequence of this construction is to remove any transverse curvature from the film and to maintain it in flat condition during the interval it is exposed to the beam of light. Means are also provided in the film trap, in definite relationship to each of the tracks, for receiving aperture plates appropriate to the different widths of films.

An additional feature of the invention is the provision of a novel form of film gate for selective assembly with the trap to yieldingly clamp the marginal edges of a film against its corresponding track. In the preferred embodiment of the invention the gate for use with the wide gage film is arranged for automatically moving to inoperative position guide rollers carried upon the trap and designed to be used in conjunction with the smaller gage film, by which expedient possibility of damage to a larger width film through failure of the operator to so move the rollers or by accidental release of the rollers is precluded.

The invention will be better understood from the following detail description of one exemplification, reference being had to the annexed sheets of drawings, in which:

Figure 2 is a cross-section of the structure shown in Figure 1;

Figure 3 is an end elevation, in part sectional, of the upper feed unit shown in Figure 1 viewed on the plane 3—3 of Fig. 1;

Figure 4 is a cross section of the upper feed unit illustrating the position of the feed rollers when engaging a 35 mm. film;

Figure 5 is a cross-section of the lower feed unit illustrating the arrangement of the feed rollers when engaging a 35 mm. film;

Figure 6 is a detached perspective of the film trap and gate in non-assembled relation, illustrating the form of gate used in conjunction with a 70 mm. film and showing the position occupied in the trap by the aperture plate;

Figure 7 is a perspective of a film gate adapted to be assembled with the trap when using a 35 mm. film;

Figure 8 is a perspective of an aperture plate designed for use with a 35 mm. film;

Figure 9 is a perspective of a form of aperture plate designed for use with a 70 mm. film;

Figure 10 is a plan of the film trap viewed in a direction opposite from that of Fig. 6;

Figure 11 is a perspective of the film trap showing a 70 mm. film being drawn thereover and illustrating the manner in which the trap functions to remove transverse curvature from a film;

Figure 12 is a perspective of the film gate shown in Fig. 6 but viewed from the opposite side thereof; and Figure 13 is a cross-section through the film trap and gate viewed on the plane 13—13 of Fig. 11 and showing the manner of assembly of the aperture plate within the trap.

Figure 1:
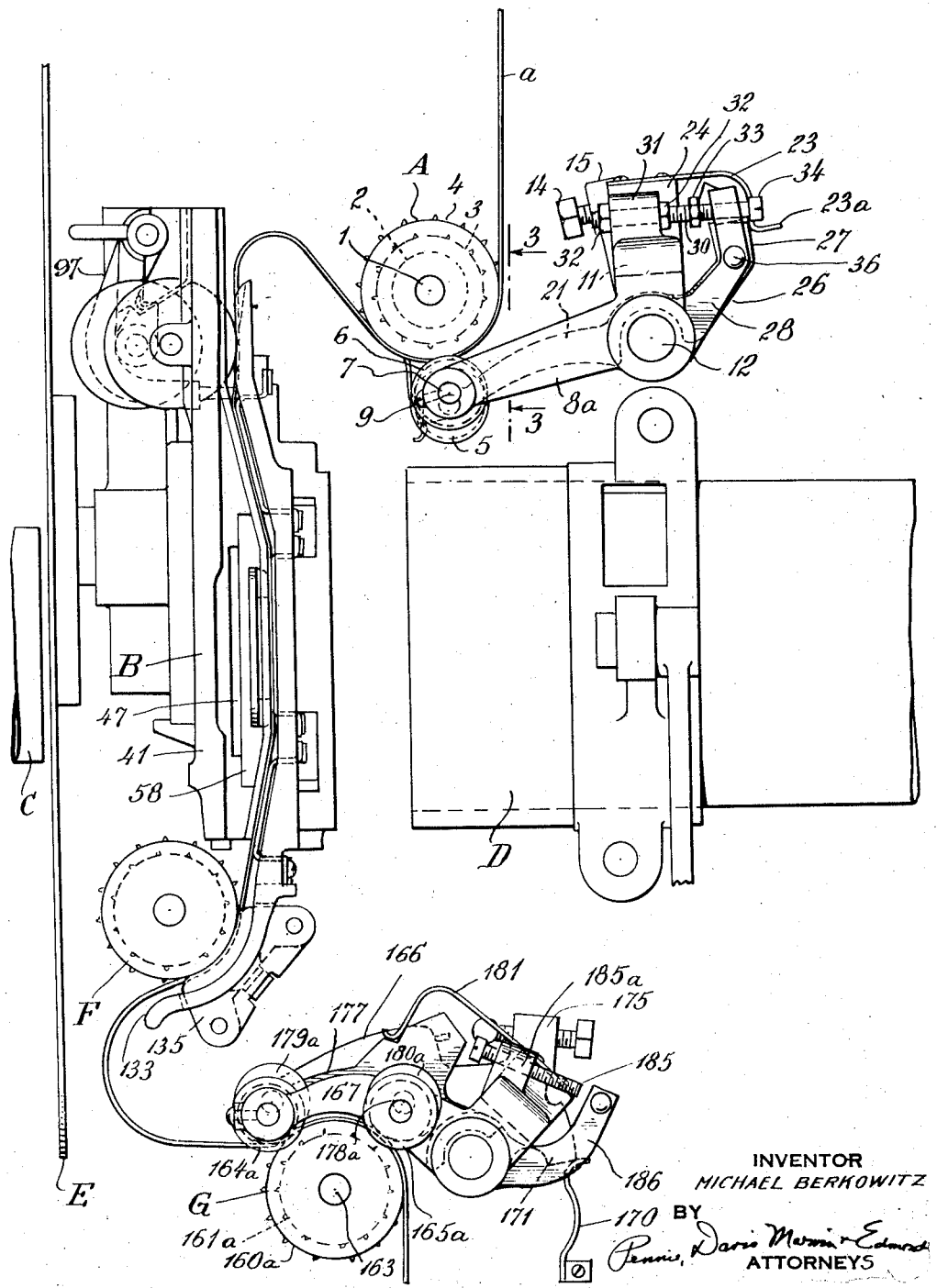
Figure 1 is a side elevation of the novel film feeding mechanism and film trap and gate assembly, and indicates their general arrangement relative to the lamphouse, shutter and focusing lens in an otherwise conventional type of projecting machine, the parts being shown in position to engage a 70 mm. film.

Conforming in its general arrangement of parts to what may be considered typical of commercial motion picture projectors now in general use, the machine of the present invention consists essentially of an upper continuous feed unit A comprising film feeding sprocket wheels for engaging perforations in the marginal edges of a film *a* together with cooperating feed rollers for pressing the film into engagement with the sprocket wheels; a film trap and gate assembly B for maintaining the film in a flat condition as it passes between the lamphouse C and the lens D; a revolving shutter E for intercepting a beam of light emanating from the lamphouse during the period the film is changing its position but allowing the beam to pass through the film while it is in repose in front of the lens D; a lower intermittent feed unit F consisting of sprocket wheels and associated means for pressing the film into engagement with the sprocket wheels; and a lower continuous feed unit G, comprising film feeding sprocket wheels together with cooperating guide rollers.

In projecting machines as heretofore constructed the feeding mechanism has included a plurality of shafts mounted in parallel relation upon each of which has been mounted two sprocket wheels positioned a fixed distance apart usually to engage the perforations in a standard 35 mm. film. In the construction about to be described the various feeding units A, F and G and the film trap and gate assembly B have been reconstructed to accommodate two different widths of films which, by way of example, have been arbitrarily chosen as 35 and 70 mm. It is to be understood, however, that the invention is not limited in its application to any specific sizes of film.

Considering in greater detail the mechanism of the upper feed unit A of the present invention: Rigidly mounted upon a shaft 1 which is continuously driven by mechanism, not shown but of the type commonly employed in motion picture projecting machines, is a drum 2 having formed integrally therewith a plurality of sprocket wheels 3, 3a, 4 and 4a provided with the usual teeth for engaging the perforations in the marginal portions of a film. The sprocket wheels are arranged in pairs; the pair of sprocket wheels 4, 4a being of larger diameter and spaced apart a greater distance than the pair of sprocket wheels 3, 3a so as to engage the perforations in a film of 70 mm. width. The pair of sprocket wheels 3, 3a, as shown in Fig. 3, is centrally located between the pair of sprocket wheels 4, 4a and is arranged to engage a film of 35 mm. width. The sprocket wheel diameters being appropriately chosen with regard to the size of the picture squares carried upon the film, the same extent of angular displacement of the shaft 1 will move whatever film is being employed a distance corresponding to the space, measured lengthwise of the film, occupied by one of its picture squares. That is, if a 35 mm. width film is being utilized it will engage the pair of sprocket wheels 3, 3a of smaller diameter and be moved only a comparatively short distance, whereas if a 70 mm. film is being employed it will be engaged by the sprocket wheels 4, 4a of larger diameter and be fed a correspondingly longer distance. In each case the distance which the film is moved in a prescribed interval of time is equivalent to the height of a picture square. This proportional relationship between the diameters of the different pairs of sprocket wheels 3, 3a and 4, 4a also obtains with respect to the pairs of feeding sprockets included in intermittent feed unit F and lower continuous feed unit G.

Cooperating with the sprocket wheels 3, 3a, 4 and 4a are guide rollers 5, 5a, 6 and 6a of the usual form each having a tread portion for engaging a marginal portion of the film and provided with a flange adapted to contact a longitudinal edge of the film so as to positively maintain transverse registry between the row of perforations in the film and the circumferential row of teeth carried by the sprocket wheel. The tread portions of the rollers are recessed to provide a clearance for the teeth of the sprocket wheels which project through the perforations in the film strip. The two outer guide rollers 6 and 6a are respectively journaled upon axially aligned pins 7 and 7a which are fixedly mounted within the outer ends of arms 8 and 8a by set screws 9 and 9a. The arms 8 and 8a are connected by an integral bridging member 11 and are capable of unitary rocking movement about the shaft 12 although normally retained by a steel spring 13 with their rollers 6 and 6a engaging the sprockets 4 and 4a. An adjustable screw 14, threadedly mounted in a lug 15 extending upwards from arm 8a is arranged to abut against the stop pin 16 carried by a stationary part of the frame to limit the pressure of the rollers upon the film strip under the influence of spring 13. The arms 8 and 8a may be rocked in a counter-clockwise direction about the shaft 12 through an arc limited by the engagement of a projection 17 with pin 16 for lowering the rollers 6 and 6a out of contact with their complementary sprocket wheels 4 and 4a, in which position the arms are maintained by the spring 13 which slides over to a different angular surface upon arm 8a.

The two guide rollers 5 and 5a which are designed to cooperate with the sprocket wheels 3 and 3a, respectively, are rotatably supported upon axially aligned stud pins 19 and 20 fixed within the outer end of an arm 21 by means of set screws 22. This arm forms an integral extension of a sleeve 21a which is mounted for limited rotation about the shaft 12, and is biased by means of a spring 23 in such direction as to engage the rollers 5 and 5a with their complementary sprocket wheels 3 and 3a, as shown in Fig. 4. This spring is fastened to the top of a lug 24 on the bridging member 11 and is formed with a terminal lip 23a which presses against the upper flat surface 25 of a projection 26 integral with but constituting a continuation of arm 21 on the opposite side of shaft 12. When, however, the arms 8 and 8a are held stationary and the arm 21 is manually depressed counter-clockwise, the terminal lip 23a slides over the surface 25 and snaps against the wall 27 of projection 26, as shown in Fig. 1 retaining the arm 21 sufficiently lowered to remove the rollers 6 and 6a out of the path of a 70 mm. film fed by the pair of large diameter sprockets 4 and 4a.

An upwardly curved arm 28 extending from the sleeve 21a is provided at its end with a slot 29, as indicated in Fig. 1, in which is received a threaded pin 30 projecting from a lug 31 on bridging member 11. The pin 30 is retained in the lug 31 by means of locking nuts 32 threaded upon the pin and bearing against opposite sides of the lug 31, while the nut 33, adjustable to different distances from the head 34 of the pin regulates the amount of relative movement which may occur between the arm 21 and the arms 8 and 8a. A finger piece 36 projects laterally from the curved arm 28 for manipulating the arm 21. When, however, the arms 8 and 8a are swung in a counter-clockwise direction through an appreciable arc, the head 34 of pin 30 engages the sides of slot 29 and constrains the arm 21 to move with the arms 8 and 8a as a unit.

The film a delivered by the feed unit A collects in a small loop above the film trap and gate assembly B and is then drawn downwardly therebetween by the intermittent feed unit F later to be described. The film trap, designated generally by the reference numeral 40, consists of an approximately rectangular shaped casting 41 capable of being rigidly mounted in a vertical position upon the frame of the machine in a well-known manner. Intermediate its lateral edges the casting 41 is formed with a flat sunken bottom 43 originating at its upper end (as viewed in Fig. 6) and extending a short distance downwardly therefrom, a sloping surface 44 rising at a slight angle from the bottom 43 and leading to an elevated flat bed 45, and a surface 46, oppositely inclined to the surface 44, leading from the bed 45 to the lower end of the casting 41. The bed 45 is cross-cut by a recess 47 in the bottom of which is an aperture 48 opening to the opposite surface of the casting. Along opposite marginal portions of the surfaces 43, 44 and 45 are flat smooth-surfaced shoes 49 and 50 rigidly fastened in place upon the casting and extending from the upper end of the casting to a position slightly overhanging the recess 47 as shown in Fig. 2. Constituting interrupted continuations of the shoes 49 and 50 are shoes 51 and 52 fixed upon the surface 46, these shoes likewise overhanging the opposite edge of the recess 47 and terminating adjacent the bottom of the casting. The shoes 49, 50, 51 and 52 together define a track over which a 35 mm. film is adapted to be drawn. The surfaces 44, 45 and 46 are flanked upon either side by two parallel walls 54 and 55 projecting a short and approximately uniform distance above these surfaces. The walls 54 and 55 are provided with transversely aligned notches 56 and 57 in which are snugly seated blocks 58 and 59 which bridge the recess 47 and which blocks in turn are provided with aligned recesses 61 and 62. Shoes 63 and 64 extending the entire length of the casting 41 and closing the tops of the recesses 61 and 62 provide smooth facings for the walls 54 and 55 and constitute a track over which a film of 70 mm. is adapted to be drawn.

Formed in the casting 41 near its upper edge and extending in parallelism longitudinally thereacross are slots 70, 71 and 72, 73. The outer pair of slots 70, 73 intersect the 70 mm. track defined by the shoes 63 and 64; while the inner pair of slots 71 and 72 open through the shoes 50 and 49 being centrally disposed with respect to the first named pair of recesses. Projecting through the recesses 70 and 73 from the opposite side of the casting are guide rollers 74 and 75, these rollers being rotatably mounted upon pins 76 and 77 fixed within ears 78 and 79 upon the casting 41. A weak compression spring 80 loosely surrounding the pin 76 bears at one end against a collar 82 formed on the pin and at its other end against the hub of roller 74, the arrangement being such that the roller 74 urges the film laterally into engagement with roller 75 and thus prevents shifting of the film as it passes along the 70 mm. track but yields in an axial direction to compensate for slight variations in its width.

In order to maintain the 35 mm. film against lateral movement as it passes over the 35 mm. track, lateral guide rollers 85 and 86 corresponding to guide rollers 74 and 75, are provided. These rollers are rotatably mounted upon shafts 87 and 88 fastened within the outer end of an arm 89. The roller 86 is retained in an axially fixed position upon the shaft 87, while a compression spring 89′, interposed between a flange 81 on the shaft and the hub of rollers 85 permits limited axial movement of the roller in response to irregularities in the width of the film. The arm 89 is rigidly fastened to the shaft 90, this shaft being journaled in lugs 91 and 92 which project from the same side of casting 41 as the lugs 78 and 79, and is adapted to be rocked by means of a finger piece 93, attached to one end of the shaft, so as to move the rollers 85 and 86 into and out of their slots 71 and 72, in which former position the rollers project above the shoes 49 and 50 and contact with the edges of the 35 mm. film. The arm 89 may be latched in inoperative position by means of a steel spring 94, as shown in Fig. 2, which resiliently engages a flat 95 formed on the arm. When, however, the arm 89 is moved in a counter-clockwise direction as viewed in Fig. 2 to bring the rollers into their corresponding slots, the curved tip of the spring slips off of the flat 95 and snaps against the inclined ledge 96 immediately thereabove. The shaft 90 has fixed thereon at one end a bent lever 97 provided with a terminal pin 98 which projects through a recess 99 in casting 41. The pin 98 is designed to contact with an imperforate surface of a film gate, later to be described, to swing the arm 89 in a clockwise direction, removing the rollers 85 and 86 from the path of a 70 mm. film.

In order to frame the picture squares carried by the film in front of the lens during the interval an image is being cast upon the screen, interchangeable aperture plates are provided having openings corresponding to the size of the picture squares. An aperture plate 100 adapted for use with a 35 mm. film is shown in detail in Fig. 8. This plate is formed with a light opening 101 of rectangular shape located intermediate two flat lugs 102 and 103. These lugs are so relatively positioned with respect to the walls 54 and 55 that their outer parallel edges 104 and 105 snugly fit between the two opposed inner faces of the walls to anchor the plate in assembly with the trap. An additional function of these lugs is to bridge the space between the ends of the shoes 49, 50, 51 and 52 which overhang the recess 47, the lugs thus constituting in effect a removable section of the 35 mm. track. The aperture plate 100 is designed to be inserted lengthwise into the slot 47 such a distance as to bring the outer edges 104 and 105 of the lugs into substantial registry with the opposed inner faces of the walls 54 and 55, respectively, after which it is moved in a direction perpendicular to its length to lock the lugs between the walls. A wedge plate 108 provided with an opening 61 conforming generally in size and shape to the opening 101 in the aperture plate but slightly in excess thereof is slid into the recess 47 behind the aperture plate to fill out the recess and insure a tight fit.

An aperture plate 110 for use with a 70 mm. film is shown in Fig. 9. This plate is in general similar to the plate 100 being provided with an opening 111 corresponding in size to the picture squares carried by a 70 mm. film and hence somewhat larger than the opening 101 in the plate 100. This opening is surrounded by a frame 112 rising a slight distance above the surface of the plate and having a smooth flat top. The plate 110, like the plate 100, is adapted to be slid lengthwise into the aligned recesses 61 and 62 in opposite sides of the walls until the edges 113 and 114 of the frame are substantially in registry with the inner faces of the walls 54 and 55, whereupon it is moved bodily forward to lock the plate in position. When so assembled the plane of the top surface of frame 112 lies in coincidence with the plane of the raised vertical surfaces of the shoes 63 and 64. A wedge plate similar to the wedge plate 108 but having an appropriately larger opening therein is inserted behind the aperture plate to secure it in position.

Two forms of film gates which are arranged to be interchangeably assembled with the film trap 40 are illustrated in Figs. 6 and 7. The film gate 115 is specifically designed for use with a 70 mm. film and consists essentially of a plate 116 having a portion which, viewed in side elevation, corresponds in general angular relationship to the elevational contour of the trap 40. This gate has an opening 117 somewhat in excess of the opening 48 in the trap, with respect to which it is centered when assembled in the machine. Extending from, and spaced apart along one lateral edge of the gate are lugs 118 and 119 provided with hooks 120 and 121 respectively as indicated in Fig. 13 to permit the ready attachment and detachment of the gate. Upon the upper end of gate 115 is a tapered lip 122 for directing the film between the assembled trap and gate. The gate is provided with two pairs of transversely opposed recesses 123, 123a and 124, 124a, these pairs of recesses being spaced apart lengthwise of the gate a distance sufficient to include between them the opening 117. The recesses 123 and 124 extend in alignment in one marginal portion of the gate while the recesses 123a and 124a extend in alignment upon the opposite marginal portion of the gate, the arrangement being such that the end walls of the opening 117 lie in common planes with the outer walls of recesses 123, 123a, 124, and 124a. Received within each of these slots is a presser member 127 formed by a strip of thin metal stock bent in the general shape of an elongated U and terminating at its opposite ends in laterally projecting lips. These lips are arranged to overlap the ends of the slots and to be resiliently held in engagement therewith by means of steel springs 128 extending crosswise of the gate and overlying the corresponding lips of two presser members located upon opposite sides of the gate. The springs 128 are fastened at their middles upon seats 129 formed on the gate, so that any tendency for the presser members to rise out of their slots is gently resisted by flexing of the steel springs. The presser members 127 protrude beyond the operative face of the gate and are arranged to yieldingly bear against the edges of the film as it passes over the 70 mm. track and press it against the shoes 63 and 64 to avoid buckling while it is stationed in front of the lens.

The opening 117 is of sufficient breadth to accommodate in its opposite ends a pair of presser members 130 similar to the presser members 127 and likewise retained in place by means of steel springs 131, these presser members 130 lying in longitudinal alignment with the presser members 127.

The lower end of the film gate 115 projects a substantial distance beyond the lower end of the film trap forming a tail 133 curved in an arc adjacent the circumferences of the intermittent sprocket wheels of feed unit F located immediately below the trap. This tail is provided with slots 134 and 134a adjacent its lateral edges as shown in Figs. 6 and 12, and within these slots are received intermittent film guides 135. The function of these guides is to press the film into engagement with the sprocket wheels. Each guide is composed of a plate 136 and a companion plate 137 formed upon their operative edges of such a curvature as to snugly seat against the circumferences of the intermittent feed sprocket wheels, and defining a space for receiving the teeth of the sprocket wheels which project through the film. These plates are assembled in pairs upon each end of two parallel rods 138 and 139 which extend across the gate and tie the four plates together in a unitary structure. A steel spring 140 attached to the gate at its middle and having its terminals received in notches 141 formed in the edges of the plates 136, operates to hold the guides in assembly with the trap.

The area circumscribed by the dotted lines 143 upon lug 118 (Fig. 12) indicates the surface adapted to contact with the pin 98 on the film trap when the gate is assembled therewith for moving the lateral guide rollers 85 and 86 to out-of-the-way positions. It will be understood that only the gate adapted for use with the 70 mm. film will engage the pin 98, for the reason that it is only when feeding a film of greater width than the distance between the guide rollers 85 and 86 that such rollers must be moved to clear.

In Fig. 7 is shown a film gate 145 for use with a 35 mm. film. This gate is similar to the film gate 115 just described although of reduced breadth, corresponding to the distance between the walls 54 and 55 between which it is arranged to be received when assembled. As a consequence the opening 146 formed in this gate is of smaller dimensions than the opening 117 in gate 115. In order that the guide rollers 85 and 86 will remain in operative position when the gate 145 is attached to the trap an aperture 147 is formed in the gate in a position which will allow the pin 98 of the bent lever 97 to pass freely therethrough. The remaining constructional details of the gate 145 require no discussion since they are identical with those described in connection with film gate 115, the principal equivalent elements being designated by the primes of the reference numerals employed in Fig. 6.

The film issuing from between the film trap and gate assembly is engaged by the intermittent sprocket wheels 150, 150a, 151 and 151a similar to the sprocket wheels 3, 3a, 4 and 4a of upper feed unit A previously described. These sprocket wheels are mounted upon a drum 152 fastened to a drive shaft 153 protruding from shell 154 housing the intermittent drive mechanism not shown but which may be of any conventional type. The spacing of the two pairs of feed sprocket wheels 150, 150a, 151 and 151a corresponds to the spacing of the pairs of sprocket wheels 3, 3a and 4, 4a for engaging either a 35 mm. or 70 mm. film, the inner pair of sprockets 151 and 151a being of proportionately smaller diameter than the outer pair of sprockets 150, 150a in accordance with the relative sizes of the picture squares carried upon the different gage films.

In addition to their usual function of moving the individual picture squares in front of the lens and holding the film at rest during its interval of exposure to a beam of light, the sprocket wheels 150, 150a, 151 and 151a are adapted to serve an additional purpose in combination with the film trap above described, namely to iron out the transverse curvature of the film as it is drawn down between the trap and gate assembly. It is very important that the film at the moment it is exposed to the light beam should lie absolutely flat in order to avoid the projection of a distorted image upon the screen. A celluloid film strip, however, after a period of time tends to warp or curl in a transverse direction and regardless of the tension which presser members 127 of the film gate may exert against its marginal edges to press these portions against the plane surfaces of the shoes, there will still be a tendency for the central portion of the film to bulge outwardly, this condition becoming more pronounced with an increase in the width of the film. In the present invention, however, the shape of the trap 40 is such as to displace the film from a normally straight vertical path, the oppositely sloping surfaces of the 35 and 70 mm. tracks being such as to define in effect humps over which either the narrow or wide gage films are pulled by the intermittent feed sprockets located below the trap, while the presser members 127 and 130 on the gate clamp the film firmly against its track and maintain it taut. The tendency of the film is therefore to be drawn flatwise against the raised surfaces of its track which action smoothes out any curl which may exist in the film.

The film fed by the intermittently operated sprocket wheels 150, 150a, 151 and 151a gathers as a loop below the film trap and gate assembly where it is picked up by the continuously driven feed unit G. This unit comprises a set of four sprocket wheels 160, 160a, 161 and 161a carried upon a drum 162 fixed upon a shaft 163 which is continuously driven by any of the usual forms of mechanism. The pairs of sprocket wheels are centrally arranged similarly to the sprockets 3, 3a, 4 and 4a of feed unit A, previously described, the outer pair of larger diameter sprocket wheels 160 and 160a being designed for feeding a 70 mm. film strip, and the inner pair of sprocket wheels 161 and 161a being arranged to engage a 35 mm. film. As shown in Figs. 5 and 10, the portion of the film wound over sprocket wheels 160 and 160a is adapted to be contacted at circumferentially spaced points by guide rollers 164, 164a, 165 and 165a which clamp the film against the sprocket wheels and turn it in the direction of the lower film magazine. These rollers are each rotatably mounted upon arms 166 and 167, the lower surfaces of which are curved in a direction closely adjacent the circumference of the sprocket wheels 160 and 160a, these arms being connected for unitary rocking movement about the shaft 168 by means of an integral bridging member 169, as shown in Fig. 2. The rollers are formed with flanges and recessed tread portions similar in structure and function to the rollers 6 and 6a of feed unit A. A steel spring 170 is attached to a fixed portion of the machine and engages a corner of a projection 171 extending from arm 166 on the opposite side of shaft 168 so as to tend to normally rotate the arms in a direction to press the rollers 164, 164a, 165 and 165a toward their two sprocket wheels 160 and 160a, but being also adapted to hold these arms in raised position when the spring is brought to bear against the surface 172. Rocking movement of the arms in a clockwise direction is limited by contact of a peg 173 on arm 166 with the stop 174. The arm 166 is formed with a lug 175 for receiving a threadedly adjustable pin 176 arranged to contact with the stop 174 for limiting the pressure of the guide rollers against the film carried by sprocket wheels 160 and 160a under the action of spring 170.

Positioned intermediate the arms 166 and 167 is a curved arm 177 projecting from a sleeve 178 pivotally mounted on shaft 168. The arm 177 carries at its outer end upon opposite sides thereof a pair of guide rollers 179 and 179a (Fig. 10) adapted to engage the smaller diameter sprocket wheels 161 and 161a respectively. These rollers are provided with flanges and recessed tread portions similar to the rollers 5 and 5a of feed unit A and are journaled upon suitable stud pins secured in axial alignment upon opposite sides of the arm. At a position located farther along the arm 177 toward its pivot are mounted two guide rollers 180 and 180a (Figs. 1 and 2) also adapted to cooperate with the pair of narrow gage sprocket wheels 161 and 161a at points circumferentially spaced from the rollers 179 and 179a. These rollers are of conventional form having the usual flanges and recessed tread portions for registering the perforations in the film with the teeth of the sprocket wheels. Like the rollers 179 and 179a, the rollers 180 and 180a are journaled upon axially aligned stud pins projecting from opposite sides of the arm 177. A spring 181 screwed to a lug 181a extending upward from the bridging member 169, is arranged to bear against a flat surface 182 of a lug 183 projecting from the upper surface of arm 177, as shown in Fig. 5. The pressure of spring 181 against the surface 182a maintains the rollers 179, 179a, 180 and 180a in engagement with the 35 mm. film carried by sprocket wheels 161 and 161a. When, however, it is desired to alter the mechanism for feeding a 70 mm. film, the arms 166 and 167 are held stationary and the arm 177 rotated in opposition to the spring 181 which slides over the surface 184 seating in a notch 184a formed on one side of the lug 183, as shown in Fig. 5, in which position the tension of the spring holds the arm 177 raised with its rollers clear of the path of the 70 mm. film. In order that the arm 177 will be raised in unison with the arms 166 and 167 when the latter arms are moved to inoperative position an adjustable pin 185 threadedly mounted in an ear 185a upon bridging 169 is arranged to contact with a member 186 rigidly connected to sleeve 178 and extending on the opposite side of shaft 168 relative to the arm 177. Thus when the arms 166 and 167 are raised the pin 185 abuts against member 186 and rocks it in a clockwise direction which in turn rotates the sleeve 178 and hence raises arm 177.

The operation of the mechanism just described is as follows: Assuming first that it is desired to project a film of 70 mm. the arms 8, 8a and 21 are rocked about the shaft 12 to inoperative position where they are held by spring 13 with the rollers 5, 5a, 6 and 6a out of engagement with sprocket wheels 3, 3a, 4 and 4a. This affords sufficient clearance between the sprockets and rollers in which to engage the perforations of the film with the teeth on the sprocket wheels 4 and 4a. After the film has been passed therebetween, the arms 8 and 8a are rotated clockwise to bring the rollers into contact with the marginal edges of the film strip wound over the sprockets, the rollers 5 and 5a remaining clear by reason of the tension of spring 23 acting against the surface 27 of projection 26.

The aperture plate 110 having an opening 111 corresponding to the picture square of a 70 mm. film, is now inserted in the recesses 61 and 62 and locked in place by a wedge plate 108. The film is led down between the pair of wide-gage guide rollers 74 and 75, over the shoes 63 and 64 and thence over the pair of sprocket wheels 150 and 150a below the film trap. The film gate 115 can at this juncture be assembled with the trap, this being accomplished in the customary manner by engaging the hooks 120 and 121 of the lugs 118 and 119 with complementary attaching members carried on the frame of the machine. If, through oversight, the pair of small gage guide rollers 85 and 86 have not manually been moved out of the path of the 70 mm. film by means of finger piece 93, the portion of the gate 143 will engage the pin 98 of the curved lever 97 and will move these rollers to inoperative position. The construction of this gate is such as to bring the presser members 127 and 130 against opposite marginal portions of the film to press it against the flat surfaces of the shoes 63 and 64. The sloping portions of the 70 mm. track operate to divert the film from its normally straight vertical path while the pull of the intermittent feed sprocket wheels 150 and 150a tends to straighten out the film. This causes the surface of the film to be biased against the raised track which together with the braking effect of the presser members 127, smoothes out any transverse curvature which may exist in the film and presents it before the lens D in a perfectly flat condition.

The film after it has been threaded through the film trap and gate assembly B and over the intermittent feed sprocket wheels 150 and 150a is formed with a small loop and then associated with the continuous feed unit G. In order to engage the perforations of the film with the teeth of sprockets 160 and 160a, the arms 166 and 167, carrying with them the arm 177, are rotated about the shaft 168 to raised position where they are held by the spring 170. This permits the insertion of the film upon the sprocket wheels 160 and 160a. The arms 166 and 167 are then returned to their original position with the rollers 164, 164a, 165 and 165a pressing against the edges of the film under the influence of spring 170 which slips around the corner to a different angular surface on the projection 171. The guide rollers 179, 179a, 180 and 180a are held in clear by the spring 181 which latches in notch 184a of the lug 183 integral with arm 177. The position of the various parts just described in readiness for projecting a 70 mm. film is shown in Figs. 1 and 2.

When it is desired to alter the machine for use with a film of 35 mm. width, this may be readily accomplished in the following manner: The 70 mm. film is removed from the machine by reversing the steps just stated. The film gate 115 is detached from the frame which permits the shaft 90 to be rocked by means of the finger-piece 93 to pass the guide rollers 85 and 86 through the slots 71 and 72 into the plane of the 35 mm. track, the arm being latched in position by the spring 94. The aperture plate 110, together with its complementary wedge plate 108 is removed from the recesses 61 and 62 and the aperture plate 100 is inserted in the recess 47. The 35 mm. film strip is now threaded through the machine in the same manner as was described with reference to the 70 mm. film except that its perforations are engaged with the central pairs of smaller diameter sprocket wheels of the various feed units and it is drawn down between the guide rollers 85 and 86 and over the 35 mm. track of the film trap. It will be observed that while the rollers 6 and 6a will bear against their complementary sprockets 4 and 4a they will rotate idly thereon and not interfere with the feeding of the 35 mm. film by the sprockets 3 and 3a. The film gate 145 shown in Fig. 7 is next secured in position, the clearance opening 147 in the gate permitting the pin 98 on shaft 87 to pass therethrough and not disturb the guide rollers 85 and 86 which have been previously moved into the 35 mm. track by the finger-piece 93. The presser members 127 and 130 on the gate urge the marginal portions of the film against the shoes 49, 50, 51 and 52 of the 35 mm. track and against the flat tops of lugs 102 and 103 on the aperture plate. The sloping surfaces of the track function in the manner which has already been described to remove any transverse curl from the film. The drive mechanism may now be set in motion to feed the film through the machine. By reason of the predetermined relationship between the diameters of the pairs of sprocket wheels and the sizes of films engaged thereby, no adjustment in the drive mechanism is required for registering the picture squares of the various size film with the openings in the aperture plates. In addition, this relationship is such as to permit any number of pairs of sprocket wheels to be assembled upon a common shaft.

While the embodiment of the invention herein described is of a construction which employs films of 35 and 70 mm. width, this is merely by way of example, it being readily apparent that the spacing of the sprocket wheels may be modified so as to permit the utilization of films of any gage desired. Nor is the invention limited in its application to only two different widths of films, but, as before stated, by taking advantage of the principles of construction herein disclosed the machine may be designed to accommodate any desired number of films of different widths.

I claim:

1. In a motion picture projecting machine comprising a light source and a lens for bringing to focus a beam of light emanating from said light source, means for selectively feeding a plurality of film strips between the lens and the light source, a platen over which the film is adapted to be drawn and a film gate arranged to press the film against the platen, in combination a plurality of pairs of lateral guide rollers adapted to engage the edges of the films, and means operable by movement of said gate for moving one pair of guide rollers to inoperative position, when said gate is closed.

2. In a motion picture projecting machine comprising a light source and a lens for bringing to focus a beam of light emanating from said light source, means for feeding any one of a plurality of films between the lens and the light source, a film trap over which the film is adapted to be drawn and a film gate arranged to press the film against the trap, in combination a pair of guide rollers mounted upon a fixed shaft for engaging the edges of the widest width of film, a pair of lateral guide rollers adapted to engage a smaller width of film, said latter pair of guide rollers occupying a position in nested relation with respect to the first mentioned pair of guide rollers, and means operable by movement of said film gate for moving said latter pair of guide rollers to inoperative position when the gate is closed.

3. In a motion picture projecting machine comprising a light source and a lens for bringing to focus a beam of light emanating from said light source, means for feeding films of different widths between the lens and the light source, a film trap over which the film is adapted to be drawn and a film gate arranged to press the film against the trap, a pivoted bracket, a pair of lateral guide rollers mounted thereon and normally adapted to engage the edges of the film, and means operable by closing said film gate for moving the bracket into inoperative position.

4. In a motion picture projecting machine comprising a light source and a lens for bringing to focus a beam of light emanating from said light source, means for imparting feeding movement to a film, a trap located intermediate the lens and the light source, means upon the trap providing a track for a film, additional means upon the same side of said trap providing a track for a film of a different width, guide rollers on said trap individual to said films and an aperture in said trap for said lens and common to both of said films.

5. In a motion picture projecting machine comprising a light source and a lens for bringing to focus a beam of light emanating from said light source, means for imparting feeding movement to a film, a trap located intermediate the lens and the light source, means upon the trap providing a track for a film, and additional means upon the trap providing a track for a film of a different width, said last named means being situated in a different plane from and on the same side of said first named means, and a pair of guide rollers on said trap individual to each of said films.

6. In a motion picture projecting machine comprising a light source and a lens for bringing to focus a beam of light emanating from said light source, means for imparting feeding movement to a film, a trap located intermediate the lens and the light source, means upon the trap providing a track for a film, additional means upon the same side of said trap providing a track for a film of a different width, a plurality of means each located in a definite relationship to the tracks for receiving aperture plates of different sizes, and guides on said trap individual to each of said films.

7. Motion picture apparatus comprising a platen having tracks for wide and narrow films, guide rollers for said films, a separate gate for each of said films and for said platen, and means for automatically moving the guide rollers for said narrow film to inoperative position when the gate for said wide film is moved into register with said platen.

8. Motion picture apparatus according to claim 7 wherein said rollers are lateral guide rollers.

9. Motion picture apparatus according to claim 7 wherein the gate for said narrow film comprises means permitting closing said narrow film gate without operating said automatic means.

10. Film guiding means for narrow film sprockets embraced by coaxial wide film sprockets comprising stub shafts spaced apart, a wide film guide roller on each of said stub shafts, narrow film guide rollers, and means for mounting said narrow film guide rollers for movement in the space between said wide film rollers.

11. Film guiding means for a combined narrow and wide film sprocket comprising wide film rollers, a rocker arm therefor, narrow film rollers embraced by said wide film rollers, a rocker arm for said narrow film rollers, a common pivot for said arms, said arms being movable in the same direction around said pivot to hold their respective films into engagement with said sprocket.

12. Film guiding means according to claim 11 comprising a spring on one of said arms and a cooperating cam surface on the other of said arms.

13. Film guiding means according to claim 11 comprising cooperating means on said arms permitting limited independent movement thereof and unitary movement thereof.

MICHAEL BERKOWITZ.